Patented June 23, 1936

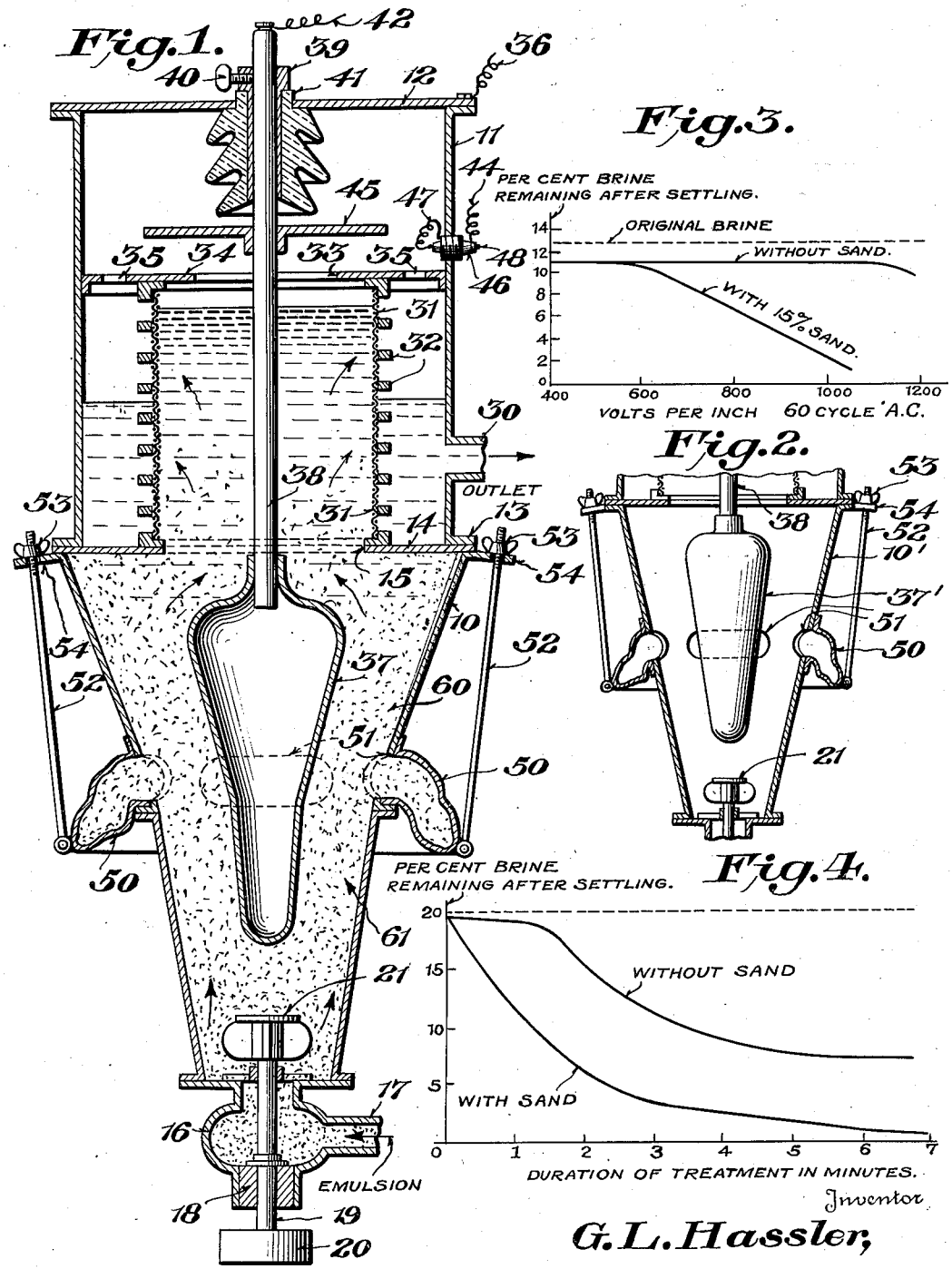

2,045,465

UNITED STATES PATENT OFFICE 2,045,465

METHOD FOR BREAKING EMULSIONS AND APPARATUS FOR CARRYING OUT SUCH METHOD

Gerald L. Hassler, Pittsburgh, Pa., assignor to Gulf Research & Development Company, Wilmington, Del., a corporation of Delaware Application June 15, 1934, Serial No. 730,805

11 Claims. (Cl. 204—24)

This invention relates to methods for breaking emulsions and apparatus for carrying out such methods; and it comprises more particularly a method of breaking water-oil emulsions, in which the oil is the continuous phase, wherein the emulsion is passed between electrodes maintained at a suitable potential difference and in the presence of a body of separated granular particles maintained in dancing suspension between the electrodes, the particles facilitating coalescence of and serving as nuclei for the deposition of water and serving to prevent chaining, and the treated emulsion is then passed to a settling zone; and it further comprises apparatus for carrying out such method, comprising a shell adapted to serve as one electrode, an inner vertical electrode spaced from the shell, a fluid inlet adjacent the bottom of the shell and an outlet at the top, means for maintaining a body of granules between the shell and the inner electrode, and for keeping the body of granules separated and in dancing suspension and advantageously means for varying the amount of granules in active service; all as more fully hereinafter set forth and as claimed.

The presence of water or brine in emulsified form in petroleum is a nuisance and is a source of considerable economic loss in the petroleum industry. In these emulsions water or brine is the internal phase, oil the external phase. The water or brine exists in the form of minute droplets of colloidal size disseminated throughout the oil. Such emulsions are delivered by many oil wells and are difficult materials to treat or handle. They are remarkably stable and permanent and in general do not yield to obvious methods of treatment such as allowing to stand for a long time, centrifuging, heating, etc. The emulsions are in themselves low-grade materials which command only a low price. Moreover, unless the water is separated out, they are not adaptable to the usual refining processes for producing gasoline, etc.; they clog stills and pumps and cause bumping (explosive boiling) when heated. Many oil-field emulsions if left to stand for a considerable period of time separate into two layers: a top layer of "dry" oil, relatively free from emulsified water, and a lower sludgy layer containing a large proportion of emulsified water. This lower layer is called "bottom settlings" or "B. S.". It is a concentrated water emulsion (10 to 20 per cent water) of highly permanent and stable form. The emulsified water is in the form of minute droplets which do not yield to ordinary methods of breaking emulsions. However, since B. S. is composed to the extent of 80 to 90 per cent of oil, economical methods for recovering the oil are a desideratum.

In order to produce a satisfactory oil stock from emulsions it is necessary to remove the suspended water substantially completely.

Many methods have been proposed, some of which have come into commercial use, for separating or breaking such emulsions. These may be divided into three general types: those in which chemical reagents are added to the emulsion to break it; those which attempt to rupture the water droplets mechanically as by passing the emulsion through fine-pored sieves or filters; and methods involving subjecting the emulsion to electrical treatment, using either alternating or direct current. In each case it is usual to circulate the emulsion through several treatment cycles; in general a single treatment is insufficient to de-water the oil.

In its basic form, electrical treatment involves passing the emulsion between spaced electrodes maintained at a potential difference of several hundred volts per inch separation of electrodes. The current causes the minute droplets to coalesce, and when the treated emulsion is allowed to stand or pass in retarded flow the water settles out to a greater or less degree.

There are several inherent disadvantages in this simple electrical method. In treating emulsions of low concentration, separation is slow and incomplete. This is because the forces of attraction between water particles, which result from charges induced thereon by the electric field between the electrodes are of very short range; and unless particles are close together the coalescing force, so to speak, is infinitesimal. In an electric field the forces tending to cause coalescence of the water particles are due to electrical dipole charges induced on the water particles by the applied electrical field. The mutual attraction between such dipole charged water particles varies inversely as the fourth power of the distance separating them; a very rapid falling off. Moreover, the strength of the induced dipole charge varies directly as the cube of the diameter of the particle. In the case of fine, dilute emulsions the water particles are widely separated and are very small. Accordingly such emulsions require excessively long treating times, high potential gradients, and agitation to bring particles close together. In cycling an emulsion through several successive electrical treatments, treatment becomes more difficult each time. Measurements I have made show that after each treatment the average size of the droplets of water decreases. The emulsion becomes "harder" and more stable. Cost of treatment becomes prohibitive after the oil has been freed of all but a certain small fraction of finely divided water. Excessively minute droplets of emulsified water, in the size range known as microns, will not combine readily of their own mutual attraction in fields of ordinary strength.

In treating high concentration emulsions, on the other hand, other difficulties appear. During the course of treatment free, de-emulsified water, largely formed from the coalescence of the microscopic droplets, appears in the emulsion in increasing amounts, in the form of large drops, while the main body of the emulsion becomes more and more dilute. This phenomenon reduces the total effective coalescing surface of the water of the emulsion. The fields of force of large drops of water are not nearly so effective as the fields of small droplets dispersed in a similar concentration. The action of a field of force in the case of a dipole charge depends on the gradient of the field (the steepness or rapidity of change in field intensity from point to point in the field) rather than on its absolute value, and the distortion fields of the smaller droplets extend through the emulsion in such a way that a greater volume of emulsion will have a relatively higher gradient of force. If the droplets are too fine, however, as of micron size, the strength of the induced dipole charge thereon is too small to bring about much coalescence.

Large drops of free water in the emulsion tend to "chain" across the electrodes, short circuiting the system. Any substantial amount of chaining stops the treatment; treatment cannot be continued until free water has been allowed to fall out of the field between the electrodes. The problem of preventing chaining in the case of concentrated emulsions has been attacked in one proposal with some success, by providing a system wherein the emulsion moves slowly between horizontal electrodes, and free water is permitted to drop down out of the field before the region of highest potential gradients is reached.

Other methods which have been proposed for electrically treating emulsions involve the provision of a filter bed for mechanically rupturing the film presumed to enclose each water droplet. The emulsion is forced through the capillary spaces between particles composing the bed, and an electric field is maintained across the bed. Such methods have the disadvantage that electrical conduction inevitably takes place either through the grains, which are in contact, or through the films of water which partially surround the particles during treatment. This internal short-circuiting is not only wasteful of current, but also shields most of the filtering body from the action of the electrical field. Attempts have been made to avoid this short-circuiting by spacing one electrode away from contact with the filtering bed; but in such arrangements there is little simultaneous action of the electric field and the filtering bed. These methods amount in effect to a filtering action followed or preceded by an electrical treatment. These attempts to combine filter action and electrical field treatment have not been successful in practice, particularly in the treatment of dilute emulsions. No economically satisfactory electrical method has hitherto been devised for the substantially complete removal of water from dilute emulsions.

In the present invention I provide improved methods and means for substantially completely removing water from emulsions of all concentrations, with a minimum expenditure of power and time. According to the invention I provide a pair of electrodes, one in the form of an outer shell or casing and the other in the form of an inner concentric member defining in combination with the outer casing an annular chamber flaring upwardly. The emulsion to be treated is passed upwardly in a flow between the electrodes and a body of granules of hard, dense, relatively indestructible material is maintained in lively dancing suspension in the flowing oil in the space between the electrodes, by the upward flow of oil and by the aid of an agitating or circulating means. A strong electric charge is induced on the granules. The granules serve as nuclei for the condensation of water from the emulsion, by reason of their charge and by reason of their lively agitation and disturbance whereby they continually shake off drops of agglomerated water before they reach excessive size. A large concentration of uniformly growing coalescing water droplets is established in the emulsion. By properly adjusting conditions the emulsion can be substantially entirely freed of water before the coalesced drops of water reach a size where chaining may occur. Very dilute emulsions can be effectively treated, since the minute distantly spaced droplets of the dilute emulsion are supplemented by a large concentration of artificial nuclei. The new method is remarkably rapid. It is not necessary to heat the emulsion; treatment can be effectively carried out in the cold. Usually, however, it is advantageous to warm the emulsion to somewhat above room temperatures, particularly when the emulsion carries a skin of solid resin or paraffin, as is sometimes the case.

In the accompanying drawing I have shown, more or less diagrammatically, two forms of apparatus within my invention and adapted for carrying out my method, and two charts giving the results of comparative tests made in treating mud fluids in the usual way, and according to the invention. In the showings, Fig. 1 is a view partly in elevation and partly in vertical section of one form of apparatus;

Fig. 2 is a similar view of a portion of a modified form of apparatus;

Fig. 3 is a chart showing the extent of dehydration of a dilute emulsion produced by treatment by a usual method and by the present invention; and Fig. 4 is a chart showing the extent of dehydration of a more concentrated emulsion after treatment according to usual methods and according to the present invention.

In Fig. 1 the apparatus is shown as comprising an upwardly flaring metal or metal-lined shell or chamber 10 in the form of two superposed portions having the form of inverted, merging frusta of cones, as shown; the upper cone having a wider angle with the vertical axis than the lower. The upper conical portion carries an upper cylindrical extension 11 covered by a top 12. The shell may be of stainless steel or any other metal lined with stainless steel or other non-corrodible metal. The lower chamber and the extension are joined by flanges 13 with an interposed separator 14 having a central orifice 15. The lower end of chamber 10 is closed by a channeled closure 16 having an inlet passage 17 for the emulsion to be treated and bearing means 18 adapted to hold a rotatable stirring device comprising a shaft 19 with a pulley 20 attached at one end and an impeller or propeller member 21 on the other end, as shown.

An outlet 30 for treated liquid is provided in the vertical extension as shown. Inside the extension is a cylindrical screen device comprising a fine wire cloth 31 backed by a heavier supporting grid indicated at 32. The screen device is in communication with orifice 15 and with the orifice 33 of a second separator or baffle ring 34 positioned in the extension as shown. Separator 34 is provided with a plurality of small orifices 35 as shown, to allow escape of gas from the space below the separator.

The extension 11 and chamber 10 are in electrical union and one electrical connection is made to extension 11 by wire 36. The chamber serves as one electrode. The other electrode takes the form of a bi-conical metallic member 37 of the same general design and contour as chamber 10, but having somewhat steeper cone angles as shown and positioned concentrically in chamber 10. Electrode 37 is mounted on a central metal rod 38 supported in top 12 by a bushing 39 having a set screw 40, the bushing being mounted in an insulator 41, as shown. The set screw allows of the electrode being adjusted vertically. Bushing 39 is advantageously made substantially gas tight. The second electrical lead is taken to this electrode by a wire 42. Electrode 37 cooperates with chamber 10 to form an annular space flaring upwards as shown. The purpose of making the electrodes in the contours shown is to provide for adjustment of the vertical change in relative cross-sectional areas in the annular space between the electrodes; the rate of dilatation upwards in the treating space. Adjustment of the inner electrode up or down causes a greater variation in the cross-sectional area of the annular space in the upper part of the treater than in the lower part, because of the greater angle included between the opposing surfaces of the upper portions of the two electrodes. Granules maintained in dancing suspension in the interelectrode space, in a way to be described below, may accordingly be controlled as to their average vertical position and distribution by adjusting the inner electrode.

While I have shown the chamber 10 and the inner electrode 37 as formed of merged frusta of cones, other contours can be used to perform the same functions. Both the chamber and the inner electrode can have surfaces continuously curving and flaring outward from bottom to top. Their horizontal cross-section is usually circular, for the sake of simplicity; but it may be oval or polygonal.

If desired the chamber 10 need not of itself form an electrode; a separate inner metallic shell may be provided. A baffle plate 45 mounted on rod 38 above orifice 33 prevents spray from reaching the insulator. The space between the top and separator 34 is adapted to collect gases freed from the emulsion and entering through orifices 33 and 35. A glow plug 46 comprising a resistance wire 47 mounted on insulating plug 48 and fed by power wire 49 is adapted to be maintained heated to incandescence during operation of the machine, to cause continual combustion of any combustible gases collecting in the upper part of extension 11. This prevents any dangerous accumulation of combustible gases in the apparatus.

As shown, chamber 10 is provided with trap means for regulating the supply of granules, comprising an annular flexible leather sack 50 communicating with the chamber through ports or orifices 51. The sack is adapted to be raised or lowered by means of supporting rods 52 having threaded thumbscrews 53 at their tops and engaging perforated extension brackets 54 on the chamber flange. Other means for regulating the concentration may be used, such as other forms of collapsible-chamber reservoirs in communication with the chamber through a valve.

The apparatus is adapted to hold a body of emulsion 60, which enters the apparatus at 17 and is agitated and moved upwardly by the impeller. A body of granules 61 is maintained in dancing suspension in the chamber, under the influence of the upward flow of liquid and of the agitator. The screen device prevents any of the suspended granules from escaping. The net cross-sectional area of the annular space between electrode 38 and the chamber increases upwardly; hence the rate of flow of the upwardly passing emulsion, and its ability to keep matter in suspension, falls off as the emulsion rises. This facilitates the maintenance of the mass of granules in suspension. Rate of flow can readily be adjusted so that the granules are all maintained in loose, agitated suspension, all the granules being kept separate from each other. With the concentrations of granules I employ, rubbing or contacting of the grains rarely occurs. The rate of flow is adjusted so that comparatively few granules reach the screen. The downward pull on the granules due to gravity, and the upward force due to the flow of fluid, are readily balanced.

In Fig. 2 I have shown a segmental view of a different form of apparatus; a simplified modification of the apparatus of Fig. 1. As shown, the chamber 10' is in the form of a simple frustum of a cone, and the corresponding inner electrode 37' is also a simple frustum of a cone. In this apparatus the rate of dilatation upwards in the interelectrode treating space, that is the vertical variation in relative cross-sectional areas in this space, cannot be regulated. Usually the form of apparatus shown in Fig. 1 is more convenient, but the apparatus of Fig. 2 is quite satisfactory in cases where it is not necessary to adjust the rate of dilatation. The stirring device, upper extension and other parts of the apparatus of Fig. 2 (not shown) are exactly like those in Fig. 1, and the operation is similar to that of the device of Fig. 1.

In carrying out the present method in the apparatus of Fig. 1 operation is as follows: A potential difference is established across the electrodes by usual means, in general from 600 to 1200 volts per inch at the average separation of the electrodes. Alternating or direct current may be used. I regard direct current as slightly better than alternating current in my method. If alternating current is used the particular frequency is not important. A flow of emulsion is passed upwardly through the apparatus at a rate sufficient to hold the granules in suspension. The agitator is rotated to assist in this function. The minute colloidal droplets of water coalesce under the influence of the electrical field between the electrodes, and the agitated particles serve as artificial nuclei about which drops form. Water condensed on the granules is continuously shaken off by the violent motion of the granules and passes out with the treated emulsion in the form of loosely held large drops or masses, which readily fall out of the liquid upon passing through a settling zone. In addition the granules stir up the liquid, and prevent chaining. The agitated body of granules is in effect a highly efficient stirring device; every part of the fluid is subjected to thorough agitation. The electrical field has an inherent tendency to cause contact of granules and thus chaining, but when granules of considerably different density from that of the emulsion are employed, as is almost always the case, the inertia of the particles and the mechanical circulating and suspending forces due to the upward flow of the viscous emulsion, effectively counteract the tendency to chain. Actual contact of granules and consequent formation of chains is prevented.

In practice conditions are readily adjusted so that the downward pull on the granules due to gravity is balanced by the upward suspending forces due to the flow of liquid, so that all the granules are freely suspended but few reach the screen.

It will readily be understood from the foregoing description that in my process the maintenance of the body of granules within the treating zone through which the emulsion is passing, inherently results in a relative motion as between the emulsion and the body of granules, this relative motion assisting in the dislodgment of such water as from time to time coalesces on the granules.

In all cases the particles are localized in the treatment zone and do not leave the apparatus. The concentration of particles in the inter-electrode space is readily adjustable while the apparatus is in operation, by raising or lowering the leather sack. In operation the voltage gradient, and concentration of granules, are adjusted to as high a value as possible while maintaining positive separation and without allowing shorting to occur. The rate of rotation of the impeller is set so as to provide as fast a flow of emulsion as possible while permitting complete treatment. When in properly regulated operation there is a high concentration of spaced nuclei for condensation distributed throughout the electrical treatment field, which makes for rapid and complete separation; and free water in the treatment field is reduced to a minimum, effectively preventing shorting. In many cases complete dewatering may be accomplished in one pass of the emulsion through the apparatus.

It is desirable to adjust conditions so that the top portions of the treatment space are quite free of granules, in order to prevent shorting of the large drops of free water which develop there.

I have tried out various granular materials for the agitated mass and on the whole I regard sand as being one of the best materials for my purpose. The sand should advantageously be screened to uniform size; 70 mesh is a convenient size. For best results the sand should be clean and sharp, not rounded as is seashore sand, for example. So-called "sharp" sand has a rough, irregular form, with sharp edges; causing maximum distortion of the electrical field between the electrodes. When matter, such as sand, having given dielectric properties is immersed in a charged dielectric field of different dielectric properties, such as a charged body of liquid, the boundary surface between the two materials is a surface of dielectric discontinuity, and distortion of field occurs. The wider the difference in dielectric properties, the greater is the distortion of field and the more pronounced is the coalescing effect. Distortion is greatest in the vicinity of sharp points or edges. Sand has other advantageous qualities for my purposes. It has a high specific inductive capacity which causes maximum distortion of the electrical field and thereby provides maximum attraction for the dielectric particles of water. Sand is non-porous and non-absorbent. It is hard and mechanically strong; it does not disintegrate or require too frequent renewal. It is considerably denser than oil emulsions and thus lends itself readily to control. Conditions may readily be adjusted to keep the granules in suspension. And lastly, sand is cheap.

Other materials which have some or all of these desirable characteristics may be used in place of, or in addition to sand, such as crushed basalt or galena. These materials have advantages because of their high density, which allows a more rapid flow of emulsion without the possibility of granules being carried out of the treatment space. The density is higher than that of the emulsion. In general substances which are preferentially wetted by water are more effective in the first stages of the treatment, while substances preferentially wetted by oil are better in later stages of treatment. The choice of a suitable material depends to a certain extent on the amount of de-emulsifying treatment necessary under given conditions and requirements. In the case of fine granules of water-wetted substances these tend to be carried upwards by the emulsion rather than to fall free of the water droplets coalescing about them. Oil-wetted granules do not adhere to the coalesced water droplets, but continually throw them off. The thrown-off water droplets serve as supplementary nuclei for condensation and thus accelerate the last stages of the de-emulsifying treatment.

As stated, the greater the dielectric discontinuity between the granules and the oil, the greater the coalescing tendency. The granules should have as high a specific inductive capacity as possible. Electrical conductors such as metals, which have an extremely high specific inductive capacity, work well in my method but are dangerous to use in practice because any interruption of the agitation or stoppage of the flow of emulsion lets the metal granules make contact, whereupon violent and destructive short-circuiting of the electrode occurs. Certain non-conducting materials however have high specific inductive capacities and give practically as good results as metal granules. Ground basalt is one such material. If the emulsion contains brine—a conductive solution—and water-wettable granules are used, the wet granules behave as though they were conductors; they have a high effective inductive capacity. Broadly speaking, granules of any material having a different dielectric constant from that of oil, or which in practice retain a film having a different dielectric constant, are useful in my method.

As to the best size for the granules, the granules should be as small as possible. Practical considerations, such as the diminishing velocity of settling in the case of the smaller nuclei, and the difficulty of providing suitable retaining screens, set an economical limit to the smallness of the granules.

In my method a mass of separated granules is kept suspended between the two electrodes. It is desirable that the electric field be equally effective at all levels of the inter-electrode treatment space. I find that in general batches of solid granules obtained in ordinary ways have most of the bulk concentrated in a relatively small range of particle sizes. In a treater with walls flaring upwardly such a mass of granules tends to concentrate at the level where the upward velocity of the oil is just sufficient to uphold them. The potential which can be applied across the electrodes is then limited by the break down voltage across these levels of highest concentration; the break down voltage being lower there than at other levels of lower particle concentration. In using batches of granules of this sort, I sometimes find it desirable to adjust the treater shape to the particle size distribution; the treater may be made with an elongated, more or less cylindrical central portion in which the most common sizes of particles find equilibrium. Usually, however, it is more convenient to adjust the particle size distribution of the mass of particles, to the particular treater; rather than to adjust the treater shape to the particle size distribution. This usually requires increasing the proportion of the finer sizes of granules over that obtained by ordinary grinding. Adjustment of the relative particle size distribution in my mass of particles is readily performed by mixing appropriate proportions of granules of different sizes, as 70-mesh, 80-mesh, etc. The size distribution should be so adjusted that under normal treatment conditions and rate of flow of emulsion, the possibility of flashing across the electrodes is the same at every level in the treatment zone.

In some cases it is advantageous to supplement the mechanical agitating device described with a stream of gas, to assist in agitating and stirring the emulsion under treatment. Under proper conditions minute gas bubbles in the emulsion serve as condensing nuclei in a way analogous to sand. The gas may be introduced from outside as a stream, or it may come from release of gas from supersaturated solution in the emulsion.

In treating exceptionally "hard" or refractory emulsions it is sometimes advantageous to recycle the treated emulsion once or twice, or to run the emulsion through two or more treating apparatus in series. If desired, the outlet may deliver to a settling tank where water is allowed to fall out and be removed and the supernatant oil returned to the apparatus. In this case the retaining screen for the granules may be omitted, and conditions adjusted so that sand is continuously carried over to the settling tank where it is removed and returned to the treating apparatus. The treating apparatus has a large treating capacity for its size. If desired it may be embodied in a portable apparatus. A self-contained high-voltage transformer for the electrode supply, and a stirring motor for shaft 19 can be mounted directly on the apparatus and the combination can be positioned directly in an oil tank with the inlet floated at the emulsion level by pontoons.

In the method as described, the granules are maintained in suspension in equilibrium between the suspending forces exerted by the upwardly flowing liquid and the downward force of gravity. If desired the particles may be of a material susceptible to magnetism and may be retained partly or wholly by a magnetic field. Also, it is not essential to rely on the flow of the emulsion to keep the particles separated and suspended; this can be done entirely by mechanical agitation, suitable impellers being provided. If balance between fluid flow and gravity are not relied upon for keeping the particles in suspension, agitation may be somewhat stronger. In this case a body of uniform-sized granules is advantageous and the separation of the electrodes should be substantially the same everywhere, so that in operation a flash over is equally liable to occur anywhere in the field. But the method involving balancing gravitational and fluid-flow forces is simple and is on the whole most advantageous.

In my method filtering action, or other mechanical distortion of the water particles, does not occur; and conduction current (short-circuiting) due to direct contact of granules or their associated water cannot occur when the method is properly carried out. Each granule is freely suspended in the field and acts independently of every other granule. The action of each granule depends on the distortion of the applied electric field, due to the fact that the specific inductive capacity of the granules is different from that of the medium in which they are immersed. Granules only touch rarely, by chance.

Figs. 3 and 4 are graphs giving test results on dewatering emulsions with, and without, my sand body system. Fig. 3 shows the amount of emulsified brine removed from a certain Goose Creek emulsion containing originally 12.5 per cent of brine, treatment being in each case for 5 minutes at 22° C., with alternating current. After treatment in each case the treated emulsion was allowed to stand for 24 hours, to settle out as much of the de-emulsified brine as it could. The ordinates give percentages of brine remaining in the emulsion after settling, for different voltage gradients. The upper curve shows the results for electrical treatment in the ordinary manner. The lower curve shows the results for electrical treatment according to the present invention, using sand in a concentration of 15 per cent by volume of emulsion. From the graph it is seen that the present method gives a much more efficient separation in a given treatment time than do old methods, the difference being more remarkable at higher potential gradients. Under the conditions of the test, satisfactory removal of brine by electrical treatment without the use of sand would have required a much longer treatment time, or much higher gradients, or several recyclings. But using sand, effective removal of water is possible with a voltage gradient of less than 1200 volts per inch, in a single, short treatment. The amount of power used is less when sand is employed.

Fig. 4 is a graph showing the results of treating a rather more concentrated Goose Creek emulsion, containing 20 per cent of brine, without sand and according to the present invention using sand in concentration equivalent to 15 per cent of the emulsion by volume. The potential gradient was 800 volts per inch, 60 cycle A. C. Treatment was cold: at 22° C. The emulsion was allowed to settle after treatment under the conditions described in connection with Fig. 3. The ordinates give percentages of brine in the treated, settled emulsion, for different treatment times (abscissæ). The upper curve shows the results with ordinary treatment; the lower curve shows the results in treatment according to the invention.

It is clear from the graph that the present method provides more complete removal of brine in a given treatment time; and a more complete ultimate removal of brine.

What I claim is:

1. In breaking emulsions by passing them continuously through an electrical field, the improvement which comprises establishing and maintaining a permanent localized body of separated granules of sizes varying from relatively coarse to relatively fine, maintained in suspension in the emulsion in the field at approximately fixed levels depending on size, the granules serving to facilitate the coalescence of the emulsified liquid and to prevent chaining, and passing the emulsion through the body of granules in the field.

2. Apparatus for breaking emulsions comprising two vertical electrodes insulated from each other and forming a treatment chamber between them and spaced from each other a greater distance at top than at bottom, electrical connections for the electrodes, the electrodes being adapted to retain between them a localized body of granules, means for continuously introducing liquid between the electrodes near their bottom and for withdrawing liquid from above the electrodes, means for preventing escape of the granules and agitating means between the electrodes.

3. Apparatus for breaking emulsions comprising an outer shell having a shape flaring upwardly and serving as one electrode, an inner vertical electrode having a shape flaring upwardly and spaced from the shell and insulated therefrom and separated therefrom a greater distance at top than at bottom, so as to form a treatment chamber between them, a fluid inlet at the bottom of the shell and an outlet at the top, circulating means near the bottom of the shell and electrical connections for the electrodes.

4. Apparatus for breaking emulsions with the aid of granules comprising two electrodes insulated from each other and spaced from each other a greater distance at top than at bottom, means for introducing a flow of liquid between the electrodes near their bottom and for withdrawing liquid from above the electrodes and agitating means between the electrodes adapted to agitate and maintain in suspension a localized body of granules in the flow of liquid between the electrodes.

5. The apparatus of claim 3 having in addition adjustable reservoir means in communication with the chamber and adapted to hold granules.

6. The apparatus of claim 3 having in addition foraminous means near the outlet for preventing escape of granules from the apparatus.

7. Apparatus for breaking emulsions comprising an inner electrode of shape flaring upwardly and an outer electrode of shape flaring upwardly and surrounding the inner electrode and spaced therefrom and means for adjusting the inner electrode vertically with respect to the outer electrode, the electrodes being spaced from each other a greater distance at top than at bottom, and the contour of the electrodes being such that vertical adjustment of the inner electrode varies the cross-sectional area of the space between the two electrodes to a greater degree in the upper part than in the lower part of the inter-electrode space, a fluid inlet near the bottom of the outer electrode and an outlet near the top.

8. The method of breaking water-and-oil emulsions, which comprises passing a continuous stream of such an emulsion in a substantially vertical direction through a zone maintained under the influence of an electrical field and containing confined therein a body of solid granules, the emulsion being passed through and past said body of granules at such rate as to maintain the body of granules in separated dancing suspension in said zone and to prevent vertical displacement of said granules out of said zone to any substantial extent, said granules serving to facilitate coalescence of the dispersed liquid, and the relative motion of the emulsion and granules serving to cause dislodgment of coalesced water on the granules, withdrawing the broken emulsion from the zone containing the confined body of granules and allowing the water to settle out.

9. The method of breaking water-and-oil emulsions, which comprises passing a continuous stream of such an emulsion in an upward direction through a zone maintained under the influence of an electrical field, said zone increasing in cross-sectional area along the path of travel of the emulsion therethrough and containing confined therein a body of solid granules, the emulsion being passed through and past said body of granules at such rate as to maintain the body of granules in separated dancing suspension in said zone and to prevent vertical displacement of said granules out of said zone to any substantial extent, said granules serving to facilitate coalescence of the dispersed liquid, and the relative motion of the emulsion and granules serving to cause dislodgment of coalesced water on the granules, withdrawing the broken emulsion from the zone containing the confined body of granules and allowing the water to settle out.

10. A method as set forth in claim 8 wherein the body of granules comprises granules varying in size from relatively coarse to relatively fine, said particles being maintained in the zone of electrical influence at approximately fixed levels according to size.

11. A method as set forth in claim 8, wherein a gas is introduced into the emulsion passing through the zone containing the body of granules to assist in agitating the granules and to provide additional nuclei for condensation of dispersed liquid.

GERALD L. HASSLER.